United States Patent [19]
Angenot et al.

[11] Patent Number: 5,650,998
[45] Date of Patent: Jul. 22, 1997

[54] METHOD FOR REASSIGNING TRAFFIC IN A COMMON CHANNEL SIGNALLING SYSTEM (SS7)

[75] Inventors: Eric Angenot, Villeneuve Loubet; Muriel Baudrion, Tourrettes sur Loup; Dominique Caillaud, Villeneuve Loubet; Valerie Gastaud, Golfe Juan; Pierre-Olivier Martin, Nice, all of France

[73] Assignee: International Business Machines Corporation, Armonk, N.Y.

[21] Appl. No.: 434,697

[22] Filed: May 4, 1995

[30] Foreign Application Priority Data

May 6, 1994 [EP] European Pat. Off. .............. 94480034

[51] Int. Cl.$^6$ ....................................................... H04J 3/12
[52] U.S. Cl. ........................ 370/225; 370/216; 370/410; 370/522
[58] Field of Search ................................ 370/110.1, 68.1, 370/58.1, 58.2, 58.3, 13, 16, 14, 17, 216, 225, 226, 227, 228, 241, 242, 244, 384, 400, 410, 522, 524, 465, 229, 235, 236; 379/210, 211, 229, 230, 231, 234; 395/180, 181, 600

[56] References Cited

U.S. PATENT DOCUMENTS 5,084,816   1/1992   Boese et al. ............................ 395/575

OTHER PUBLICATIONS

CCITT Specifications of Signalling System No. 7, 1989, pp. 124–156, Sections 5 & 6.
Jonathan L. Wang, "Traffic Routing and Performance Analysis of the Common Channel Signaling System 7 Network", 1991, pp. 301–305.

Proceedings of the CCITT Plenary Assembly (Blue Book); Specifications of Signalling System No. 7, vol. 6, No. 7, 1989 Geneva CH pp. 127–131 'Recommendation Q. 704: Signalling network functions and messages; sections 2.2 to 2.4'.

Proceedings of the IEEE, vol. 80, No. 4, Apr. 1992, New York US pp. 607–617, XP304351 Jabbari 'Routing and congestion control in Common Channel Signalling System No. 7' pp. 610, 612, 614.

Proceedings of the National Communications Forum, vol. 43, No. 2, 2 Oct. 1989, Chicago US pp. 930–936, XP225004 El–Toumi et al. 'Interconnecting SS/ signaling networks' p. 932.

IEEE Global Telecommunications Conference & Exhibition, Session 47, Paper 5, vol. 3, 28 Nov. 1988, Hollywood, FA US pp. 1560–1563, XP12094 Amirazizi 'Controlling synchronous networks with digital cross–connect system'.

Primary Examiner—Wellington Chin
Assistant Examiner—Huy D. Vu
Attorney, Agent, or Firm—Gerald R. Woods

[57] ABSTRACT

A method for balancing traffic among parallel links connecting two signalling points of a Common Channel Signalling System (SS7) when one or more of the links becomes unavailable. A change-over process causes SLS (Signalling Link Selection) field values originally associated with the unavailable link to be reassigned to remaining available links on a distributed basis. A change-back process, used where a previously unavailable link is restored to service, causes SLS field values to be reassigned from the other available links to the restored link.

4 Claims, 3 Drawing Sheets

METHOD FOR REASSIGNING TRAFFIC IN A COMMON CHANNEL SIGNALLING SYSTEM (SS7)

TECHNICAL FIELD OF THE INVENTION

This invention relates to data communication in general and more particularly to data communication systems which conform to Signalling System 7 specifications. More particularly, the invention relates to a method for reassigning traffic from a signalling link that has become unavailable in a common channel Signalling System (SS7) to alternative signalling links.

BACKGROUND ART

Common channel Signalling System number 7, defined by CCITT Recommendations, provides support for large numbers of applications in telecommunication networks. In particular, the SS7 protocols permits systems to be optimized for operation in digital telecommunications networks in conjunction with stored program controlled exchanges.

Detailed information related to the SS7 protocol can be found in CCITT Recommendations Q. 700 to Q. 716, entitled "Specifications of signalling system number 7".

An overview of Signalling System number 7 can be found in an article "An overview of Signalling System number 7", by Abdi R. Modarressi et al, Proceedings of the IEEE, vol. 80, no. 4, April 1992, page 590.

More details can be found in a document "Common Channel Signalling System Number 7 for ISDN and Intelligent Networks" by Bijan Jabbari, Proceedings of the Generally speaking, the CCITT SS7 specification is based on circuit-related telephony control requirements. To meet these requirements, four functional levels were specified as illustrated in FIG. 1, the Message Transfer Part comprising levels 1-3 and the User part comprising level 4.

Level 1 of the Message Transfer Part defines the physical, electrical and functional characteristics of a signalling data link and the means to access it. Level 2 defines functions and procedures relating to the transfer of signalling messages over an individual signalling data link. Level 3, in principle, defines transport functions and procedures that are common to and independent of the operation of individual signalling links. Generally speaking, these transport functions fall into two major categories:

a) Signalling message handling functions that, upon actual transfer of the message, direct the message to the proper signalling link or User part.

b) Signalling network management functions that, on the basis on predetermined data and information about the status of the signalling network, control current message routing and the configuration of the signalling network facilities. In the event of changes in status, the network management functions also control reconfigurations and other actions needed to preserve or restore normal message transfer capability. The detailed requirements for signalling network functions are given in Recommendation Q.704.

Reconfiguration of message routing involves the use of two particular procedures: a change-over procedure and a corresponding change-back procedure. The objective of the change-over procedure is to ensure that signalling traffic normally carried by a link that becomes unavailable is reassigned to alternative signalling link(s) as quickly as possible while avoiding message loss, duplication or mis-sequencing. For this purpose, the change-over procedure includes buffer updating and retrieval, which are performed before opening alternative signalling link(s) to the reassigned traffic. Buffer updating consists of identifying all messages in the retransmission buffer of the failed signalling link which have not been received by the far end. The identification is the result of a hand-shake procedure, based on change-over messages, performed over signalling links which continue to connect the two points at the ends of the failed signalling link.

Conversely, the change-back procedure is used to restore, to an original signalling link, traffic which had been diverted to alternative signalling links, while avoiding message loss, duplication or mis-sequencing. For this purpose, change-back includes a procedure to control the message sequence. Change-back procedures perform functions which are generally opposite to functions performed during change-over procedures.

In order to initiate a change-over procedure, it is necessary to have a mechanism to determine the signalling links which will be used to carry the traffic diverted from an original signalling link that has become unavailable. Conversely, the change-back procedure requires that a mechanism be provided for determining which traffic carried on alternative signalling links will be restored to an original signalling link that has become available again.

A known method for identifying alternative links is to designate a specific backup link for each original link. If an original link fails, all traffic which would have been carried on that link is diverted to the designated backup link. This simple process has the drawback of abruptly and perhaps heavily loading the designated backup link when the original link fails.

SUMMARY OF THE INVENTION

The present invention solves the problem of selecting suitable alternative signalling links which can be used, following a change-over procedure, to carry traffic which would normally be conveyed on a now-unavailable signalling link. The invention also solves the problem of determining what traffic should be assigned to a previously unavailable signalling link when that link again becomes available.

According to the present invention, Signalling Link Selection (SLS) field values which had been assigned to a link which becomes unavailable are reassigned to the remaining available links on a distributed or cyclical basis so that all available links are, to the extent possible, uniformly loaded.

More preferably, the method according to the invention involves a change-over procedure allowing the signalling traffic carried by a link that has become unavailable to be diverted to another signalling link sharing the same link set as the failed link. When a link in a link set connecting two signalling points becomes unavailable, a link subset is created, consisting of all the links that remain available to carry traffic between the two signalling points. The SLS field values which had been associated with the now-unavailable link are reassigned to the links in the subset on a cyclical basis to distribute the SLS field values among the remaining available links.

In a preferred embodiment, the method further includes a restoration or change-back process for reassigning SLS field values when a previously-unavailable link is restored to service and can once more carry traffic between the two signalling points. According to this restoration process, all SLS field values originally associated with the restored link are reassigned to that link. Additionally, if another link remains unavailable, the SLS field values originally associated with that link are identified and are distributed among the currently active links to provide as uniform distribution of message traffic as possible.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL FIELD

Figure 1:
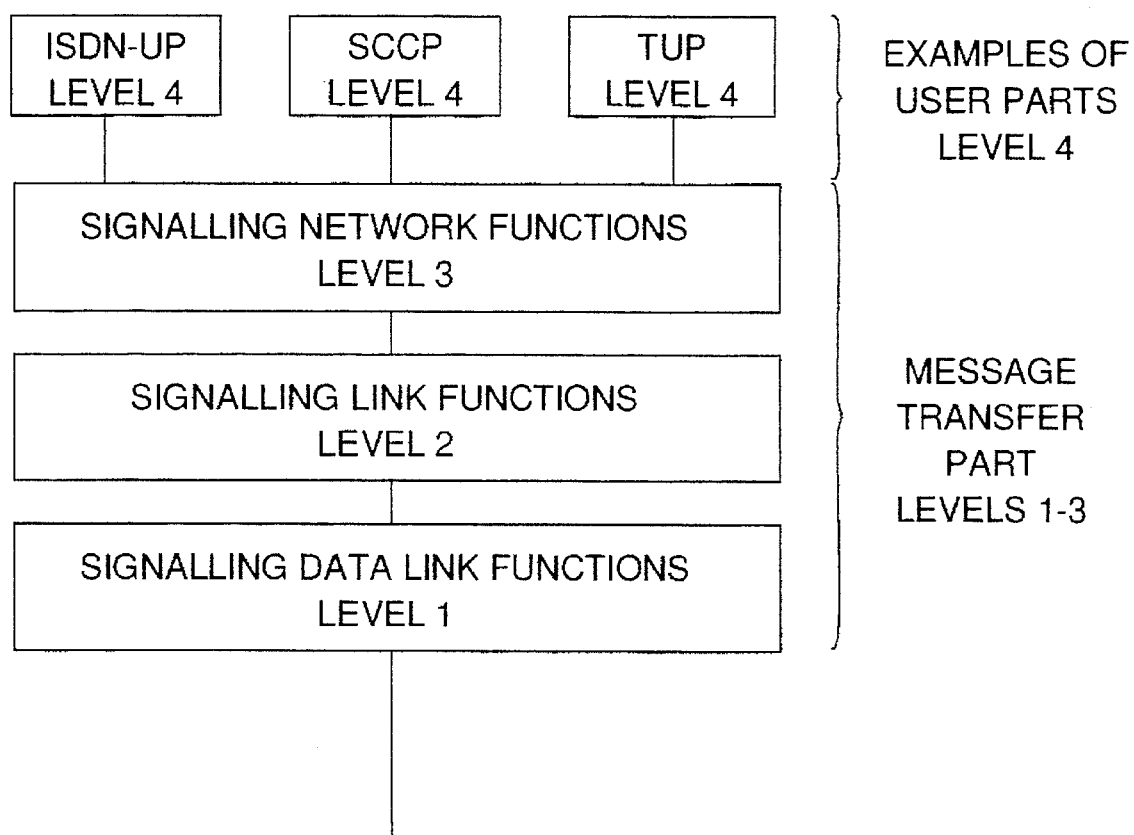
FIG. 1 illustrates the four functional levels of the Signalling System 7 or SS7 architecture.

The common channel signalling system uses signalling links to convey the signalling messages between two signalling points. A number of signalling links that directly interconnect two signalling interconnected signalling points which are used as a module constitute a signalling link set. The CCITT Recommendations define two distinctive basic cases of lcad sharing.

The first case is lcad sharing between links that belong to the same link set. The second case is load sharing where links do not belong to the same link set. The present invention will be described hereinafter in detail only for the first case; that is, load sharing of links which belong to the same link set.

As mentioned above, level 3 of the Message Transfer Part of SS7 protocol consists of signalling network functions which are basically divided into two categories:

signalling message handling, and
signalling network management.

The former category allows signalling messages originated by a particular User Part at a signalling point to be delivered to the same User Part at the destination point indicated by the sending User Part. The Signalling message handling functions are divided into three distinctive parts. First, a message routing function identifies the outgoing signalling link on which a message is to be sent towards its destination point. Second, a message discrimination function is used at a signalling point to determine whether or not a received message is destined for the point itself. When the signalling point has the transfer capability and a message is not destined for it, that message is transferred to the message routing function. Finally, a message distribution function is used at each signalling point to deliver received messages to the appropriate User Part.

A message is an assembly of information, defined at level 3 or 4, that is transferred as an entity by the message transfer function. Each message contains service information including a service indicator identifying the source User Part and possibly additional information such as an indication whether the message relates to international or national application of the User Part. The signalling information of the message includes the actual user information, such as one or more telephone or data call control signals, management and maintenance information, etc. and information identifying the type and format of the message. It also includes a label that provides information enabling the message to be routed by the level 3 functions through a signalling network to its destination. This part of the label is referred to as the Routing label. Additionally the label allows the message to be directed at the receiving User Part to the particular circuit, call management function or other transaction to which the message is related.

The standard routing label mentioned before has a length of 31 bits. It comprises a Destination Point Code (DPC) which indicates the destination point of the message. The originating point (OPC) indicates the originating point of the message. Additionally a Signalling Link Selection (SLS) field is included for use in performing load sharing.

The message routing function which is involved in message handling generally processes the DPC in the standard routing label in order to determine the link set over which a particular message is to be sent. The message routing function then uses the SLS in the standard routing label in order to identify the particular link (hereinafter referred to as the associated link) within this link set which will be used for actually sending the message. To achieve this, a first table is used to identify a particular link set which corresponds to a predetermined DPC field. Then, for each particular link set, an additional table (referred as the Current Distribution table) identifies the particular link within this link set which corresponds to a predetermined SLS field value. For each link, the list of the different SLS field values associated with the link is called the Current List.

In an ideal configuration, when all the links are available to transport messages, the same number of SLS field values are assigned, to the extent possible, to each of the links. This ideal arrangement is referred to as a Reference Distribution. For instance, assuming that a link set has four distinctive links, and that the SLS field may take 16 different values, the Reference Distribution will be such that four different SLS field values are assigned to each link. As a further example, if the link set included only three different links, the Reference Distribution could be as follows:

| SLS Field | Link |
| --- | --- |
| 0 | 1 |
| 1 | 2 |
| 2 | 3 |
| 3 | 1 |
| 4 | 2 |
| 5 | 3 |
| 6 | 1 |
| 7 | 2 |
| 8 | 3 |
| 9 | 1 |
| 10 | 2 |
| 11 | 3 |
| 12 | 1 |
| 13 | 2 |
| 14 | 3 |
| 15 | 1 |

In this Reference Distribution, link 1 is associated with six different SLS field values 0, 3, 6, 9, 12 and 15 (which are referred to as being the Reference List for link 1). The two other links (number 2 and 3) are each assigned or associated with five SLS field values.

The Reference Distribution is a ideal configuration which is determined by system designers.

In addition to the signalling message handling functions, level 3 of the Message Transfer Part includes signalling network management functions which control reconfiguration of the signalling network in case of link failures and network congestion. The change-over and change-back processes which will be described hereinafter are included in this second category of functions.

Figure 2:
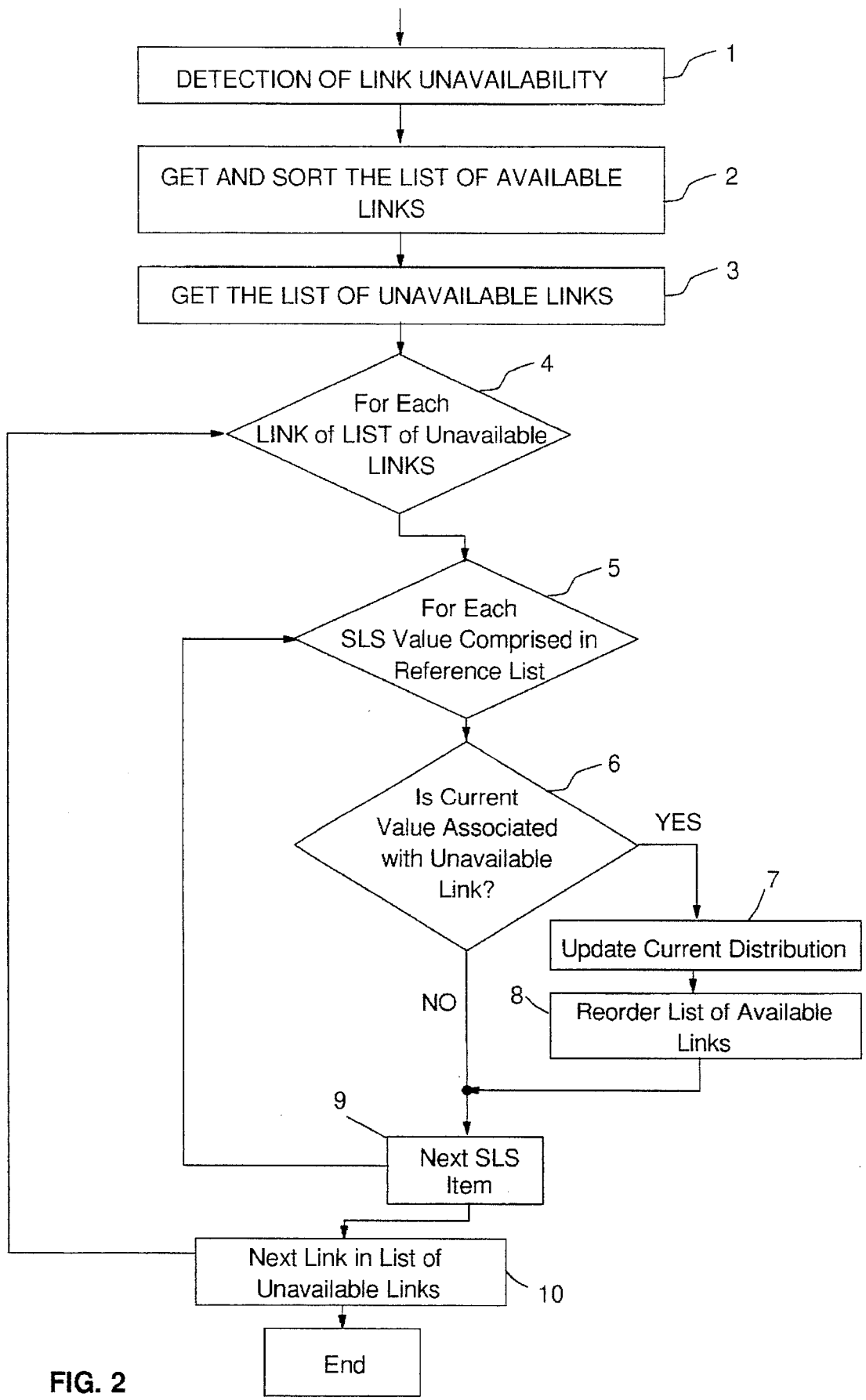
FIG. 2 is an illustrative flow chart of a change-over process, performed upon link failure, to reassign network traffic to remaining links so as to distribute or balance the lcad on the remaining links.
Figure 3:
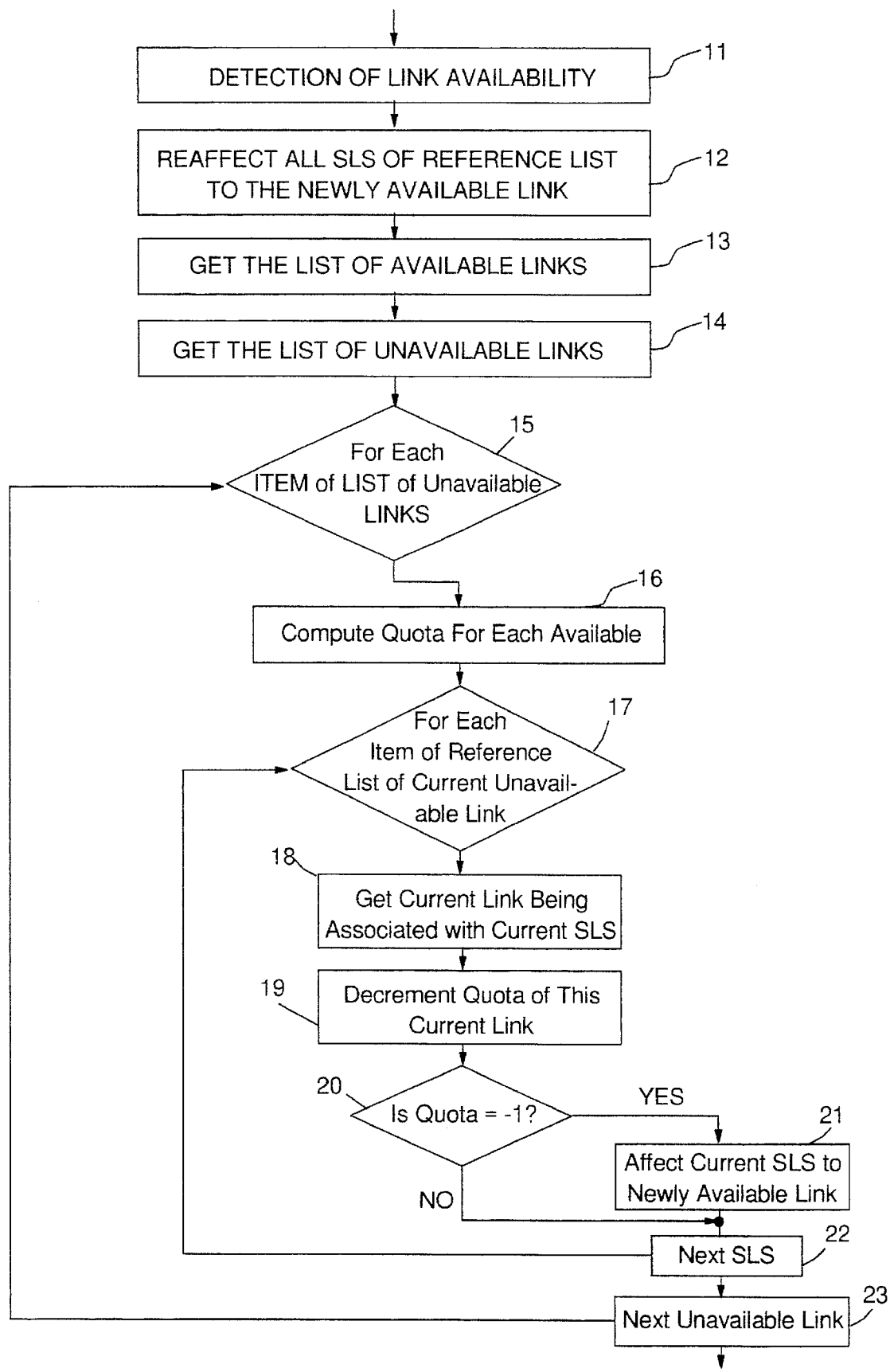
FIG. 3 is an illustrative flow chart of the change-back process, performed when a link is restored to service, which rebalances the lcad across all of the available links, including the restored link.

In accordance with the present invention, the change-over process will be detailed in reference with FIG. 2. The change-over process is initiated (step 1) upon detection that a link has become unavailable. Link unavailability is generally indicated by messages provided by level 2 of the Message Transfer Part. Detection of link unavailability may also result from a manual or automatic request obtained from system or network managers. Details of the link availability detection may be found in the CCITT Recommendations Q.704, Fascicle VI.7, section 3.2., but will not be provided herein as such detection is not considered part of the present invention. Then, in step 2, the signalling network management function of layer 3 generates a list of the links which are still available in the link set within which the link failure has been detected. This link list is ordered or sorted so the first element has the least number of associated SLS field values, the second element has the next smallest number of associated SLS field values, etc. The last element on the list will, of course, be assigned or associated with the greatest number of SLS field values.

Using the example of three different links and sixteen possible SLS field values, assume that link number 2 becomes unavailable. Before link number 2 becomes unavailable, the Current List of link number 1 consists of six SLS field values: 0, 3, 6, 9, 12 and 15 while the Current List of link number 3 contains five SLS field values: 2, 5, 8, 11 and 14.

Step 3 results in the creation of list of links that remain unavailable. In this example given, the only link on the created list is link number 2. In actual networks, multiple links may be unavailable at any given time for various reasons. Step 4 begins a first FOR loop which is used to reiteratively process the unavailable link list created in step 3 in a manner described below.

Step 5 is the beginning of a second FOR loop which is used to iteratively process each of the SLS field values associated with the selected link on the unavailable link list. As noted above, the only link on the list in this example is link number 2.

The second FOR loop starts with a test (step 6) which determines whether the SLS field currently being considered is associated with one of the links on the unavailable link list. If the result of this check is positive, the SLS field value currently being considered is reassigned to the link at the top of the available link list created in step 2. The available link list is then re-ordered in a step 8 by moving the affected link from the top to the bottom of the ordered list.

If the test performed in step 6 had revealed that SLS field value being considered was not associated with an unavailable link, meaning it must be associated with a link that is still available, then there is no reason to consider reassigning this particular SLS field value. The process proceeds to step 9 where the next SLS field value in the Reference List is considered. This next and succeeding SLS field values are processed in accordance with steps 5, 6, 7 and 8 as was described before.

When the last SLS field value in the Reference List has been processed, meaning that all SLS field values initially associated with a now-unavailable link have been reassigned to the remaining available links, the process proceeds to step 10 where a next link of the list of unavailable links generated in step 3 is processed. This next link becomes the current link. The SLS field values assigned to this next link are distributed among the available links using the FOR loop defined by steps 5, 6, 7, 8 and 9.

The process is reiterated for every link on the unavailable link list. When the last unavailable link has been processed by distributing its SLS field values to other available links, the process ends.

In the preceding example, link number 2 was assumed to become unavailable. Therefore, step 2 of the described process returns a sorted available link list which consists of link number 3 (with which five SLS field values are originally associated) and link number 1 (with which six SLS field values are originally associated.

Step 3 of the process returns the list of the unavailable links. In this case, the list consists of only link number 2. The SLS field values (1, 4, 7, 10 and 13) initially assigned to link number 2 are processed or reassigned to links 1 and 3 in accordance with steps 4–10.

The first SLS field value to be reassigned is equal to 1. In this very simple example, the Current Distribution, just before the failure of link number 2, is identical to the Reference Distribution. Step 6 will indicate SLS field value is associated with the now-unavailable link number 2, which causes the process to branch to step 7. In that step, SLS field value 1 is reassigned to the first link on the current available link list; that is, to link number 3. The available link list is then reordered by link number 3 to the bottom of the list, leaving link number 1 at the top of the list. In the simple example given, it is apparent that links 3 and 1 alternate as being at the top of the available link list.

Then, as a result of step 9, the next SLS field value on the Reference List (SLS=4) is processed in the loop which begins with step 5. In the simple example given, every SLS field value being considered is associated with now-unavailable link number 2. This means that every SLS field value in the reference list will be reassigned to either link number 1 or link number 3 during successive iterations of the FOR loop defined by steps 5 through 9.

When all of the SLS field values originally associated with link number 2 have been reassigned to either link number 1 or link number 3 as a result of change-over process described above, the Current Distribution for the link set becomes as follows:

| SLS Field | Link |
| --- | --- |
| 0 | 1 |
| 1 | 3 |
| 2 | 3 |
| 3 | 1 |
| 4 | 1 |
| 5 | 3 |
| 6 | 1 |
| 7 | 3 |
| 8 | 3 |
| 9 | 1 |
| 10 | 1 |
| 11 | 3 |
| 12 | 1 |
| 13 | 3 |
| 14 | 3 |
| 15 | 1 |

The distribution of the different SLS field values between the two available links is balanced since every link is now associated with eight different values of the SLS field. This results from the elementary processing of each SLS value in the Reference List for each unavailable link, combined with the two different sorting operations which are performed in steps 2 and 8 of the change-over process.

The above-described change-over process works in conjunction with a change-back process which causes SLS field values to be reassigned to a previously unavailable link when that link has been restored to service. The change-back process which will be described below ensures that, when all of the links again become available, the distribution of SLS field values will be identical to the Reference Distribution for the ideal condition. Under non-ideal conditions (not all links are available), the change-back process will ensure that the loading of all the available links will be equal or close to equal.

The Change-back process begins with step 11 where the layer 3 of the Signalling Network Management function detects that a previously unavailable link can be restored to service. In step 12, the Reference List of the restored link is accessed. Each SLS field value on the Reference List is reassigned from its current link to the restored link.

The foregoing step by itself will, in typical situations, result in the restored link being less heavily loaded than other available links. The steps described below will cause additional SLS field values to be reassigned from other available links to the restored link in order to equitably and partly unload the other available links. In step 13, a list of all available links, including the restored link, is generated. In step 14, a list of all links remaining unavailable is produced.

For each link on the unavailable link list, the following technical steps (referred to as steps 15–23) will be applied by means of a first FOR loop beginning at step 15.

This first FOR loop begins with step 16 where a quota is computed for each available link. In order to compute this quota, the number of SLS field values that are listed in the Reference List of the current unavailable link is divided by the number of currently available links. The quota for each available link is equal to the integer result of this division. If the total quota (the quota per link multiplied by the number of available links) is less than the number of SLS field values on the Reference List under consideration, the quota for one or more of the available links is incremented one unit at a time until the total quota does equal the number of SLS field values. For reasons which will become clear in the following description, it is immaterial to which of the available links the increased quotas may be assigned. Although the choice of the particular available link that has its quota increased by 1 may slightly affect the final distribution of the different SLS field values to the link, the final distribution of SLS field values remains substantially balanced. In a step 17, a second FOR loop is initiated to process each SLS field value on the Reference List of the currently unavailable link being considered.

This second FOR loop starts with step 18 where it is determined with which link the particular SLS item being currently considered is associated. The link identified by step 18 is referred to as the current link. In step 19, the quota assigned to this current link is decremented and the result compared to −1 in a step 20. If the quota has reached the value −1, then the process proceeds to step 21 where the particular SLS element being considered is reassigned to the newly available link. The next step (step 22) is reached either through step 20 or through step 21. In step 22, the next SLS element in the Reference List corresponding to the current unavailable link is accessed and the looped process is repeated beginning at step 17.

When all the SLS field values in the Reference List have been processed as described above, the process proceeds to step 23 which causes the next link on the unavailable link list to be selected. The process loops back to step 15 and is repeated for the newly selected link.

At the completion of the change-back process, the newly available link will be assigned all of the SLS field values on its Reference List plus additional SLS field values which were originally associated with other links which continue to be unavailable. The additional SLS field values are reassigned from other available links to balance the SLS distribution among all available links, including the newly restored link.

An illustrative example of the change-back process is described below. Assume a distribution of the 16 SLS field values among 4 different links—links number 1 to 4.

The Distribution Reference for such a system is as follows.

| SLS Field | Link |
| --- | --- |
| 0 | 1 |
| 1 | 2 |
| 2 | 3 |
| 3 | 4 |
| 4 | 1 |
| 5 | 2 |
| 6 | 3 |
| 7 | 4 |
| 8 | 1 |
| 9 | 2 |
| 10 | 3 |
| 11 | 4 |
| 12 | 1 |
| 13 | 2 |
| 14 | 3 |
| 15 | 4 |

Therefore, the Reference List for the systems is the following:

Link 1: SLS0, SLS4, SLS8, SLS12
Link 2: SLS1, SLS5, SLS9, SLS13
Link 3: SLS2, SLS6, SLS10, SLS14
Link 4: SLS3, SLS7, SLS11, SLS15

Assume that the change-back procedure is initiated when both links 1 and 4 are available and link 2 becomes available again.

Prior to the instant where link 2 becomes available, the Current Distribution is as follows:

| SLS Field | Link |
| --- | --- |
| 0 | 1 |
| 1 | 4 |
| 2 | 1 |
| 3 | 4 |
| 4 | 1 |
| 5 | 1 |
| 6 | 4 |
| 7 | 4 |
| 8 | 1 |
| 9 | 4 |
| 10 | 4 |
| 11 | 4 |
| 12 | 1 |
| 13 | 1 |
| 14 | 1 |
| 15 | 4 |

When it is determined that link number 2 is restored to service, all of the SLS field values in the Reference List for that link (SLS1, SLS5, SLS9 and SLS13) are immediately reassigned in step 12 from either link number 1 or link number 4. Then, in step 13, the list of available links (links 1, 2 and 4) is created. In step 14, the list of unavailable links (link 3) is also created.

Then the first (and only in this example) link on the list of unavailable links is processed in the first FOR loop beginning at step 15.

In step 16, a quota is computed for each available link. Since the Reference List for link number 3 includes 4 elements, and since there are three available links, step 16 leads to the division of 4 by 3 which yields a per link quota of 1 plus a remaining part also equal to 1. Each available link is assigned a corresponding quota as follows.

The quota of link number 1 is incremented by one unit to be equal to 2; the quota of link number 2 is chosen to be equal to 1; and the quota of link 4 is fixed to 1.

The sum of the quotas is equal to 4, which is the number of items in the Reference List associated with link 3.

Then, the second FOR loop beginning at step 17 is performed for each SLS field value on the Reference List for link number 3.

The first SLS field value considered on the Reference List for link 3 is equal to 2. Step 18 identifies the link (link number 1) in the current distribution to which the SLS field value 2 is currently assigned. The quota value for link number 1 is decremented in step 19, reducing it from 2 to 1. The comparison performed in step 20 therefore fails and nothing is done with SLS field value of 2; that is, this field value remains assigned to link number 1. The process then goes to step 22 where the next SLS field value on the Reference List for link number 3 is considered.

The second SLS field value on the Reference List of link number 3 is equal to 6. The link to which this SLS field value is currently assigned (that is, link 4) is identified in step 18 as before. The quota for link 4 is then decreased by 1, reducing it to zero. Consequently, the test performed in step 20 fails again, leaving the SLS field value of 6 assigned to link number 4 and causing the next SLS field value on the Reference List to be processed.

The third SLS field value on the Reference List of link number 3 is equal to 10, which step 18 will show is currently associated with link number 4. The quota for link number 4, currently equal to 0, is then reduced by 1 in step 19, producing a positive result from the comparison performed in step 20. As a consequence, the process branches to step 21 where the SLS field value being considered, that is SLS field value 10, is reassigned from link number 4 to the newly restored link number 2. Then, the process proceeds to the next step 22 which causes the next (and last) SLS field value in the Reference List for link number 3 to be considered.

The last SLS field value on the Reference List of link number 3 is equal to 14, which is currently assigned to link number 1. When the quota for link number 1 is decremented, the remaining quota is 0, which results in the SLS field value of 14 to remain assigned to link number 1.

Since all of the SLS field values on the Reference List for link number 3 have been processed, the change-back process proceeds to step 23. Since link 3 was the only unavailable link, the FOR loop is not repeated. The change-back procedure eventually leads to the following distribution:

| SLS Field | Link |
| --- | --- |
| 0 | 1 |
| 1 | 2 |
| 2 | 1 |
| 3 | 4 |
| 4 | 1 |
| 5 | 2 |
| 6 | 4 |
| 7 | 4 |
| 8 | 1 |
| 9 | 2 |
| 10 | 2 |
| 11 | 4 |
| 12 | 1 |
| 13 | 2 |
| 14 | 1 |
| 15 | 4 |

The change-back process according to the present invention causes the SLS field values to be reallocated in order to provide a load distribution which is balanced as much as possible among the available links.

While there has been described what are considered to be preferred embodiments of the invention, variations and modifications therein are likely to occur to those skilled in the art once they are made aware of the basic inventive concepts. Therefore, it is intended that the appended claims shall be construed to include not only the preferred embodiments but all such variations and modifications as fall within the true spirit and scope of the invention.

We claim:

1. For use in a network in which two adjacent signalling points are connected by parallel links forming a link set and in which each individual message to be transported between the two adjacent signalling points includes a signalling link selection (SLS) field identifying the link over which the message is to be transported, a method of managing message traffic between the two adjacent signalling points to balance the traffic on available links, said method comprising the steps of:

a) creating a link list in which each of the possible SLS field values is assigned to a currently available link in the link set;

b) detecting when one of the links in the link set ceases to be available to carry message traffic;

c) creating a subset of links in the link set, the subset including all links which continue to be available to carry messages;

d) creating an ordered link list by arranging the links within the created subset as an inverse function of the number of SLS field values currently associated with the link in the created subset;

e) reassigning an SLS field value which had been associated with the now-available link to the link at the head of the ordered link list;

f) re-ordering the ordered link list by moving the link to which an SLS field value has been reassigned in the preceding step to the bottom of the ordered link list; and g) repeating steps e) and f) until all SLS field values which had been assigned to the now-unavailable link are reassigned to one of the links in the ordered link list.

2. A method as defined in claim, 1 wherein steps a) through g) are repeated each time a link becomes unavailable.

3. For use in a network in which two adjacent signalling points are connected by parallel links forming a link set and in which each individual message to be transported between the two adjacent signalling points includes a signalling link selection (SLS) field identifying the link over which the message is to be transported, the initial assignment of SLS field values to all links in the link set being identified as a reference list, a method of redistributing SLS field values if a previously unavailable link is restored to the link set, said method comprising the steps of:

a) reassigning to the restored link any SLS field values initially associated with that link in the reference list;

b) identifying links which continue to be unavailable;

c) using the reference list, identifying SLS field values initially associated with the links which are identified in step b) as continuing to be unavailable; and d) assigning one or more of the SLS field values identified in step c) to the restored link to cause the SLS field values to be distributed as uniformly as possible among the available links.

4. For use in a network in which two adjacent signalling points are connected by parallel links forming a link set and in which each individual message to be transported between the two adjacent signalling points includes a signalling link selection (SLS) field identifying the link over which the message is to be transported, the initial assignment of SLS field values to all links in the link set being identified as a reference list, a method of managing message traffic between the two adjacent signalling points to balance the traffic on available links, said method comprising the steps of:

a) creating a link list in which each of the possible SLS field values is assigned to a currently available link in the link set;

b) detecting when a link which had unavailable is restored to service;

c) accessing the reference list to identify all SLS field values initially assigned to the restored link;

d) reassigning the SLS field values identified in step c) to the restored link;

e) identifying a link which remains unavailable;

f) calculating a quota for each available link by 1) dividing the number of SLS field values assigned to the link identified in step e) by the number of available links to obtain an integer value;

2) multiplying the integer value by the number of available links to obtained a total quota value;

3) where the total quota value is less than the number of available links, incrementing the quota value for one of the links until the total quota equals the number of available links;

g) accessing the reference list for the link identified in step e) to obtain one of the SLS field values in the reference list;

h) decrementing the quota for one of the available links by one and comparing the result to a predetermined threshold value;

i) if the decremented quota is equal to the threshold value, then reassigning the SLS value obtained in step g) from the link identified in step e) to the currently available link identified in step h);

j) if the decremented quota is greater than the threshold value, determining whether the reference list contains additional SLS field values; and k) if the reference list contains additional SLS field values, obtaining the next SLS field value on the list and repeating steps h) through j) until all SLS field values on the accessed reference list have been considered.

* * * * *